(12) United States Patent
Maruyama (10) Patent No.: US 9,372,700 B2
(45) Date of Patent: Jun. 21, 2016

(54) NETWORK BOOT SYSTEM (71) Applicant: CO-CONV, Corp., Kyoto-shi, Kyoto (JP)

(72) Inventor: Shin Maruyama, Toyonaka (JP)

(73) Assignee: CO-CONV, Corp., Kyoto-shi, Kyoto (JP)

( * ) Notice: Subject to any disclaimer, the term of this patent is extended or adjusted under 35 U.S.C. 154(b) by 0 days.

(21) Appl. No.: 14/240,794

(22) PCT Filed: Sep. 18, 2013

(86) PCT No.: PCT/JP2013/075094
§ 371 (c)(1),
(2) Date: Feb. 25, 2014

(87) PCT Pub. No.: WO2014/046105
PCT Pub. Date: Mar. 27, 2014

(65) Prior Publication Data
US 2015/0331696 A1     Nov. 19, 2015

(30) Foreign Application Priority Data

Sep. 18, 2012  (JP) .................................. 2012-203793

(51) Int. Cl.
*G06F 9/44* (2006.01)
*G06F 12/08* (2016.01)

(52) U.S. Cl.
CPC .......... *G06F 9/4416* (2013.01); *G06F 12/0868* (2013.01); *G06F 12/0871* (2013.01); *G06F 12/0888* (2013.01); *G06F 2212/1024* (2013.01); *G06F 2212/224* (2013.01)

(58) Field of Classification Search
CPC .......................... G06F 9/4416; G06F 12/0868
See application file for complete search history.

(56) References Cited

U.S. PATENT DOCUMENTS

| 2011/0083006 A1* | 4/2011 | Maruyama | G06F 9/4416 713/2 |
| 2011/0224811 A1* | 9/2011 | Lauwers | G06F 3/16 700/94 |
| 2012/0084775 A1* | 4/2012 | Lotlikar | G06F 9/45558 718/1 |

FOREIGN PATENT DOCUMENTS

WO       2009/145274 A1    12/2009

OTHER PUBLICATIONS

English Translation of International Search Report of PCT/JP2013/075094.

*Primary Examiner* — Albert Wang
(74) *Attorney, Agent, or Firm* — Muncy, Geissler, Olds & Lowe, P.C.

(57) ABSTRACT

[SUBJECTS] To suppress decrease in boot speed and slowness in operation of a terminal even when the terminal is booted the second or subsequent time in a private mode in which the terminal directly writes to a virtual disk.
[SOLVING MEANS] In a network boot system 100, a network boot server 10 and a terminal 20a are connected over a network 30, the network boot server 10 providing a disk image, as a virtual disk 22b, containing an operating system that operates on the terminal, the terminal 20a being provided with a storage device 21a. The OS is provided with a read cache mechanism that stores data read from the server as cache data in the storage device. Generation management data M and rewrite management table T2 are provided. When the client terminal is booted the second or subsequent time in a private mode in which the terminal directly writes to the virtual disk, the read cache mechanism replaces the rewrite management table with the generation management data and boots up a read cache while avoiding using cache data that has been modified.

15 Claims, 4 Drawing Sheets

Fig. 3A

Cache Management Table T1 of Revision 8 (Rev. 8)

Sector A: Cache Done (Cache Management Flag: 1)
Sector B: Uncached (Cache Management Flag: 0)
Sector C: Cache Done (Cache Management Flag: 1)

Fig. 3B

Rewrite Management Table 2 to Which Modified Region Map M Is Copied

Sector A and Sector B Are Modified Regions,
Sector C Is Non-Modified Region
Modified Region: 1
Non-Modified Region: 0

Fig. 3C

Table T3 Indicating Whether Or Not Cache Data of Revision 8 Can Be Utilized

Sector A: Cache That Cannot Be Utilized (Cache Management Flag: 0)
Sector B: Cache That Cannot Be Utilized (Cache Management Flag: 0)
Sector C: Cache That Can Be Utilized (Cache Management Flag: 1)

Logical AND between Cache Management Table T1 and Logical INVERT of Rewrite Management Table T2

NETWORK BOOT SYSTEM

TECHNICAL FIELD

The present invention relates to a network boot system that boots an operating system over a network.

BACKGROUND

In recent years, it is generally known that, in a system (hereinafter referred to as a "network boot system") that boots an operating system (hereinafter referred to as an "OS") over a network, in order to reduce a load on a network boot server, a read-only cache (hereinafter referred to as a "read cache mechanism") is provided in a part of a physical storage device on a client terminal side.

In Patent Document 1, a network boot system is disclosed in which a read cache mechanism is provided that can reduce network access to a network boot server by caching a virtual disk of the network boot server in a local disk of a PC (client terminal) that is used by an end user in the network boot system. The virtual disk is generation-managed using revise information (hereinafter referred to as "revision") and the revision is updated along with revise of the virtual disk such as installation of an updated program and a configuration change. The read cache mechanism has a cache management table corresponding to the revision of the virtual disk in each terminal and presence or absence of cache data is decided using the management table.

The above-described network boot system further has a write cache region for caching write information and a write management flag. Due to the write management flag, whether or not data in a certain sector is modified can be decided and the read cache mechanism avoids using cache data held in a sector that is modified. As a result, the read cache mechanism effectively utilizes cache data, thereby reducing the network load. Therefore, in such a network boot system, even when a large number of client terminals are booted all at once, on the second or subsequent boot, there is almost no access to the network and the client terminals can be booted at high speeds.

The above-described network boot system has a share mode (standard mode) and a private mode. The share mode is a mode in which a plurality of client terminals share and use a virtual disk on the network boot server and is a mode for causing the system to operate in a normal operation environment. On the other hand, the private mode is a mode in which only a specified client terminal can directly write to the virtual disk on the server and is a mode for causing the system to operate in a maintenance environment. By booting a client terminal in a state of the private mode, data of the virtual disk can be modified by performing update or new installation of the OS or a program, a configuration change, or the like.

PRIOR ART RELATED DOCUMENT(S)

Patent Related

[PATENT DOCUMENT 1] International Publication No. 2009/145274

SUMMARY OF INVENTION

Subjects to be Solved by Invention

However, in the conventional network boot system as described above, when a client terminal in a maintenance operation in the private mode is rebooted, or the client terminal is shutdown and another terminal is booted, that is, when the terminal is booted the second or subsequent time in the private mode, there is a problem that boot and operation of the client terminal become slow.

When the terminal is booted the "first time (on the first time boot)" in the private mode, at the moment of the boot, content of the virtual disk is equal to a state of a specific revision. Therefore, cache data in the terminal can be utilized. However, when the terminal is booted the "second or subsequent time (on the second or more time boot)" in the private mode, a state of the virtual disk is different from the specific revision. Therefore, cache in the terminal that has data of the specific revision cannot be utilized as is. Therefore, when the terminal is booted the "second or subsequent time" in the private mode, the read cache mechanism is stopped in order not to cause serious troubles such as that the OS of the client terminal does not boot or abnormally stops due to inconsistency between the data of the virtual disk on the network boot server and the cache data of the terminal. The stopping of the read cache mechanism is one factor causing problems such as that the boot and operation of the terminal in the private mode become slow.

The present invention has been made in view of the above-described circumstances and a main technical subject of the present invention is that, in a network boot system that is provided with a read cache mechanism, even when a client terminal is booted the second or subsequent time in the private mode in which a client terminal directly writes to the virtual disk on the server, a decrease in boot speed or slowness in operation of the client terminal are suppressed.

Means for Solving Subjects

A network boot system of the present invention is characterized, wherein a network boot server and a client terminal are connected over a network, the network boot server providing a disk image, as a virtual disk, containing an operating system that operates on the client terminal, the client terminal being provided with a physical storage device, the operating system is provided with a read cache mechanism that stores data read from the server as cache data in the storage device, the network boot system is provided with generation management data for generation-managing a transition of revision that represents revise information of the virtual disk and a rewrite management table for managing a write cache on the client terminal side, and the read cache mechanism, when the client terminal is booted the second or subsequent time in a private mode in which the client terminal directly writes to the virtual disk, replaces the rewrite management table with the generation management data and boots up a read cache while avoiding using cache data that has been modified.

The generation management data is data that indicates which region of the virtual disk was modified due to a transition of revision of the virtual disk (disk image), specifically, by performing update, new installation, or a configuration change, deletion and the like, of the OS or a program in the virtual disk. A region where cache data was modified is known by associating a region of the virtual disk with a region where the cache data is stored.

According to this configuration, even when the client terminal is booted the second or subsequent time in the private mode, by using the generation management data as the rewrite management table, the read cache mechanism can boot up a read cache while avoiding using cache data that has been modified, and decrease in boot speed or slowness in operation of the client terminal can be suppressed by reducing network access from the client terminal to the network boot server.

In the above network boot system, it may be preferred that the rewrite management table is stored on the client terminal side, and when the client terminal is booted the second or subsequent time in the private mode, the generation management data is copied to the rewrite management table.

In the above network boot system, it may be preferred that the network boot system includes a store region having at least one bit for respectively writing a certain value P when the client terminal is booted in the private mode and a value other than the certain value P at an end of the private mode in a part of the virtual disk. Wherein, when a value of the store region is the certain value P, the read cache mechanism determines that the client terminal is booted the second or subsequent time in the private mode and boots up the read cache. As a result, a determination whether or not the client terminal is booted the second or subsequent time in the private mode can be easily performed.

A network boot server of the present invention is characterized in providing over a network a disk image, as a virtual disk, containing an operating system that operates on the client terminal to a client terminal. Wherein the operating system is provided with a read cache mechanism that stores data read from the server as cache data, the client terminal is provided with a rewrite management table for managing a write cache, and, the network boot server comprises generation management data for generation-managing a transition of revision that represents revise information of the virtual disk, and the generation management data is copied to the rewrite management table when the client terminal is booted the second or subsequent time in a private mode in which the client terminal directly writes to the virtual disk.

A client terminal of the present invention in a network boot system is characterized, which is connected over a network to a network boot server that provides a disk image, as a virtual disk, containing an operating system that operates on the client terminal. Wherein the operating system is provided with a read cache mechanism that stores data read from the server as cache data in a storage device, the network boot server comprises generation management data for generation-managing a transition of revision that represents revise information of the virtual disk, the client terminal is provided with a rewrite management table for managing a write cache, and the generation management data is copied to the rewrite management table when the client terminal is booted the second or subsequent time in a private mode in which the client terminal directly writes to the virtual disk.

By using the network boot server or client terminal of the above network boot system to configure a network boot system, even when the client terminal is booted for the second or subsequent time in the private mode, the read cache mechanism can boot up a read cache while avoiding using cache data that has been modified, and a decrease in boot speed and slowness in operation of the client terminal can be suppressed by reducing network access from the client terminal to the network boot server.

A boot procedure of a read cache mechanism of a network boot system is characterized in which a network boot server and a client terminal are connected over a network, the network boot server providing a disk image, as a virtual disk, containing an operating system that operates on the client terminal; the operating system is provided with a read cache mechanism that stores data read from the server as cache data in the terminal, the network boot system is provided with generation management data for generation-managing a transition of revision that represents revise information of the virtual disk, and rewrite management table for managing a write cache on the client terminal side, wherein the boot procedure comprises: a determination step of determining whether or not the client terminal is booted the second or subsequent time in a private mode in which the client terminal directly writes to the virtual disk; a step of, when the client terminal is booted the second or subsequent time in the private mode, replacing the generation management data with the rewrite management table of the client terminal; and a step of booting up a read cache using the replaced rewrite management table while avoiding using cache data that has been modified.

The above boot procedure of the read cache mechanism is characterized, wherein the network boot system comprises a store region having at least one bit for respectively writing a certain value P when the client terminal is booted in the private mode and a value other than the certain value P at an end of the private mode in a part of the virtual disk, and the determining step determines that, when a value of the store region is the certain value P, the client terminal is booted in the private mode and the second or subsequent time.

Advantages of Invention

In the network boot system according to the present invention, even when the client terminal is booted for the second or subsequent time in a state of a private mode in which the client terminal directly writes to the virtual disk on the server, a decrease in boot speed and slowness in operation of the client terminal can be suppressed.

BRIEF DESCRIPTION OF INVENTION

FIGS. 3A-3C illustrate conceptual diagrams describing a method for applying a rewrite management table to a cache management table in the network boot system of the present embodiment.

EMBODIMENTS FOR IMPLEMENTING INVENTION

In the following, a network boot system of the present embodiment is described in detail with reference to the drawings. First, an embodiment of a network boot system that is provided with a read cache mechanism, where are premises of the present invention, is exemplarily described. Descriptions for each embodiment should be purposefully interpreted in order to understand a technical thought of the present invention. The thought should not be limited with the descriptions of these embodiments.

Figure 1:
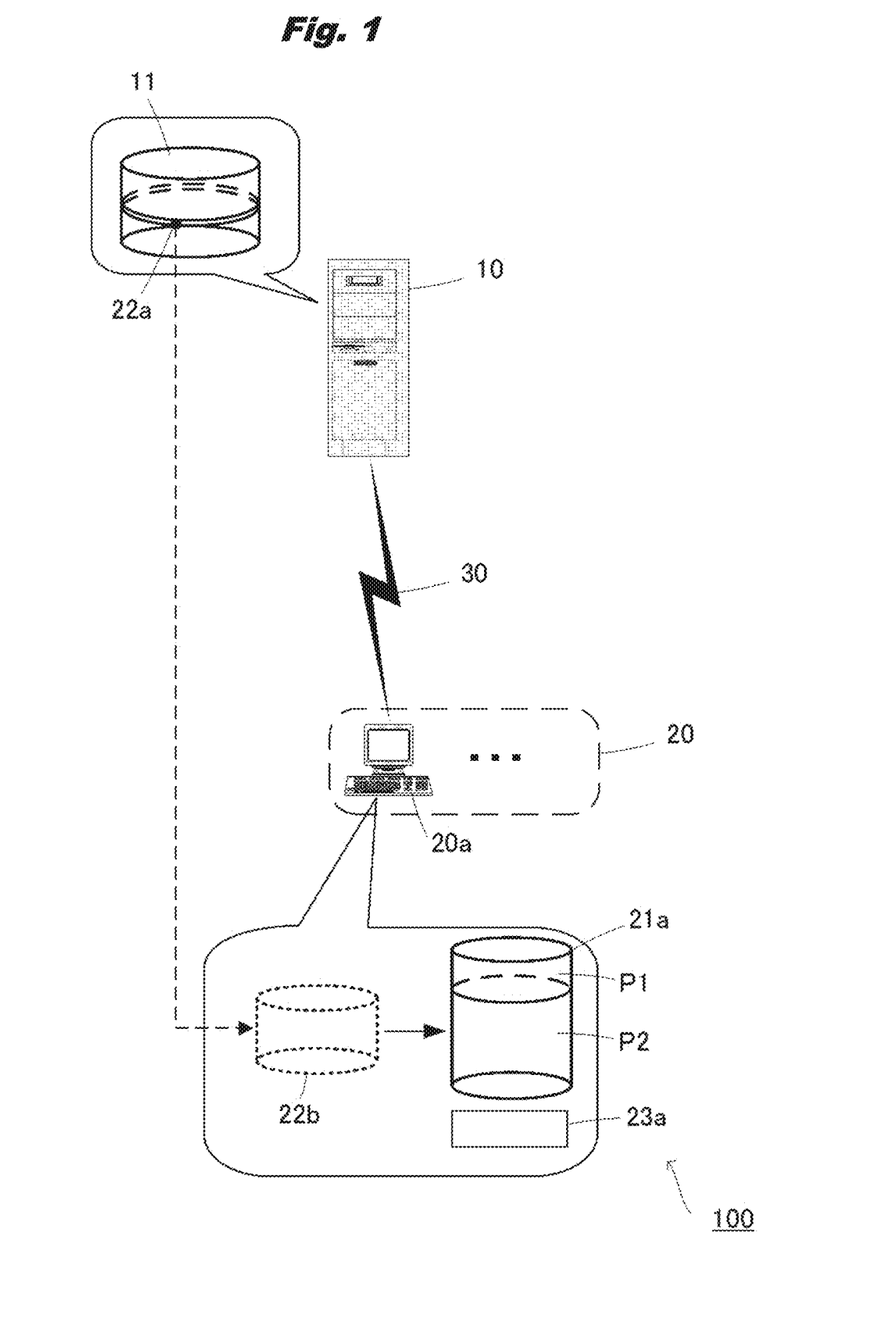
FIG. 1 illustrates a conceptual diagram for describing a basic configuration of a network boot system of the present embodiment.

FIG. 1 illustrates a conceptual diagram for describing a basic configuration of a network boot system of the present embodiment. As illustrated in FIG. 1, in a network boot system 100, a server 10 and a plurality of client terminals 20 (20a, . . . ) are connected over a network 30. The server 10 is provided with a physical disk 11. The client terminal 20a is provided with a physical disk 21a as a physical storage device, a virtual disk 22b and a physical memory 23a. The server 10 and the client terminal 20a are each provided with basic configuration elements such as a CPU (which is not illustrated in the drawings). A disk image 22a of an OS that is read when each of the client terminals 20 (20a, . . . ) is initially booted is stored in the physical disk 11. Here, the term "physical disk" refers to a storage device such as a tangible hard disk. The physical disk 21a has a first partition P1 that is recognized at a logical level and a second partition P2 that is recognized at a physical level. A write cache region is mainly allocated in the first partition P1. A read cache region and a cache management region are mainly allocated in the second partition P2.

As a basic operation of the client terminal 20a, a filter driver of the terminal 20a transforms an access to the virtual disk 22b that is virtually connected to the terminal 20a into an access over a network to the virtual disk 22a of the server 10 side. The terminal 20a is provided with a read cache driver for causing a read cache mechanism to function. The read cache driver is a program and mainly performs data access (write and read) with respect to the read cache region in the physical disk 21a. The read cache driver read-caches data read from the server 10 by storing the data as cache in the read cache region on the physical disk 21a. The read cache region is in one-to-one association with the disk image 22a.

Further, in the client terminal 20a, write data with respect to a write request signal of the OS and the like is stored in the write cache region of the physical disk 21a. The write data is used as a write cache. When the write cache is used, update information (user data or the like) of the terminal 20a can be stored on the terminal 20a side. Therefore, there is an advantage that the network load can be reduced. The read cache driver has a rewrite management table for managing the write cache.

The network boot system 100 has two operation modes including a "standard mode" and a "private mode." The standard mode is a mode in which a plurality of client terminals 20 (20a, . . . ) share and use the virtual disk 22a on the server 10 and is a mode for causing the system to operate in a normal operation environment. On the other hand, the private mode is a mode in which one client terminal can directly write to the virtual disk 22a on the server 10 and is a mode for causing the system to operate in a maintenance environment. By booting a terminal in a state of being set to the private mode, data of the virtual disk can be modified by performing update or new installation of the OS or a program, a configuration change, or the like. In the standard mode, the write cache is effective. Even when the terminal 20 performs write, the virtual disk 22a on the server 10 is not modified, and each time the terminal 20a is rebooted, the terminal 20a is generally booted using the virtual disk 22b in an initial state. By initializing upon reboot, content of the virtual disk is not easily changed. Further, in the private mode, the write cache is ineffective. When the client terminal 20 performs write, the virtual disk 22a on the server 10 is modified.

Figure 2:
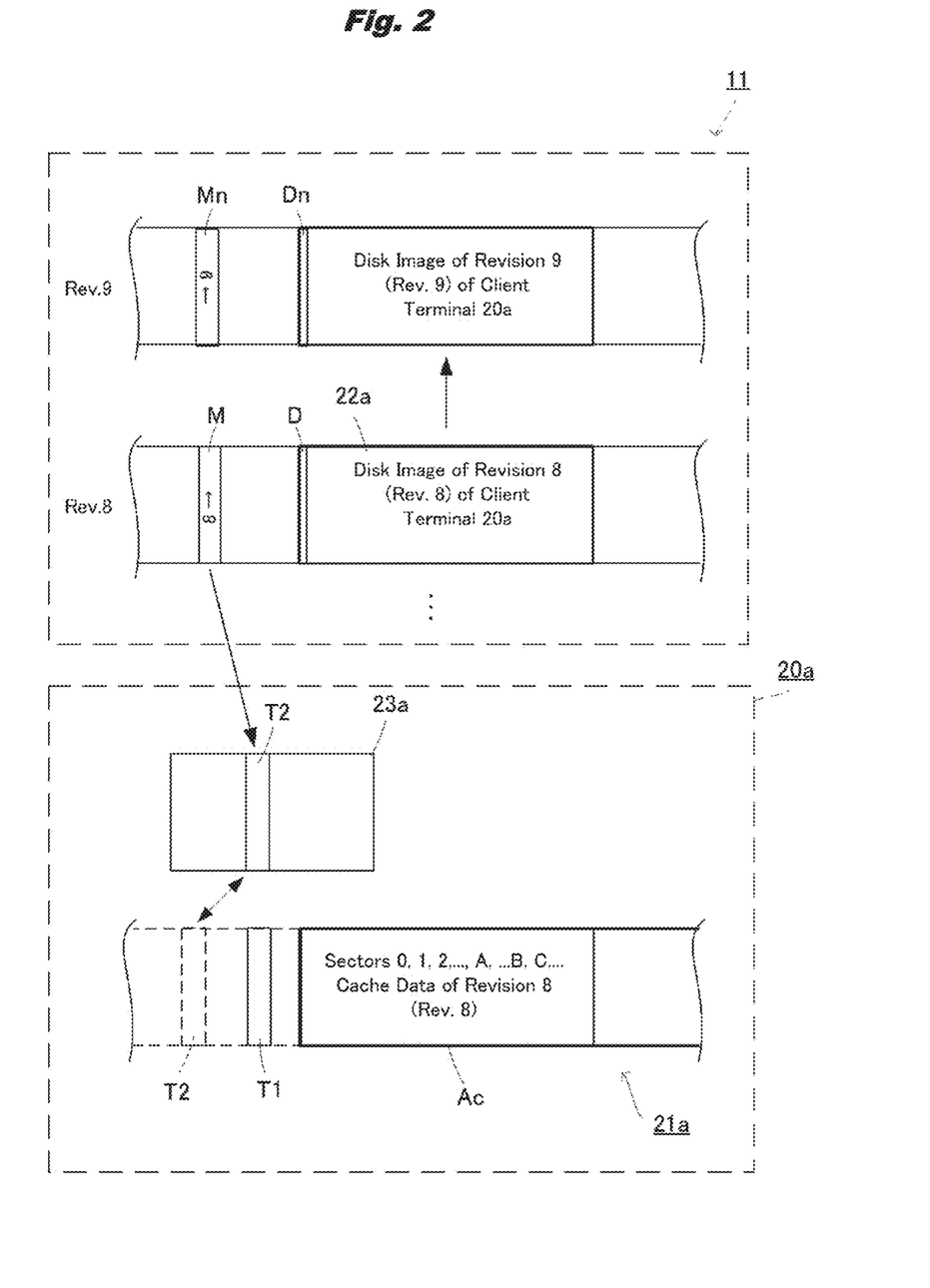
FIG. 2 illustrates a conceptual diagram for describing a modification region map of the network boot system of the present embodiment.

FIG. 2 illustrates a conceptual diagram for describing a modified region map of the network boot system of the present embodiment. As illustrated in FIG. 2, on the physical disk 11 of the server 10, disk images of the client terminal 20a that are managed for respective revisions ( . . . , Rev.8, Rev9, . . . ), modified region maps as generation management data of the disk images, and dirty flags as management flags are stored. For example, the disk image 22a of a revision 8 of the terminal 20a, a modified region map M as the generation management data of the disk image 22a, and a dirty flag D are stored. Further, on the physical disk 21a of the terminal 20a, cache data read by the above-described read cache driver and a cache management table T1 of the revision 8 are stored. Generally, on the physical memory of the terminal 20a, a rewrite management table T2 is stored. The rewrite management table T2 may also be stored on the physical disk 21a.

The cache management table T1 of the revision 8 is data that indicates whether or not cache data of the disk image 22a of the revision 8 exists in a read cache region Ac, and is, for example, a bit array that respectively uses 1 to indicate a region (sector) where cache data is present and 0 to indicate a region where cache data is absent. The cache management table T1 of the revision 8 manages the cache data of the revision 8. The cache data of the revision 8 is associated with the disk image 22a of the revision 8. The cache management table T1 is read to the physical memory of the terminal 20a and is periodically written back to the cache management region.

The rewrite management table T2 is data that indicates whether or not there has been a write request signal with respect to the data of the disk image 22a of the revision 8, and is associated with the cache data of the disk image 22a of the revision 8 that is stored in the read cache region Ac. For example, the rewrite management table T2 is a bit array that respectively uses 1 to indicate a region (sector) in the read cache region Ac that corresponds to data of the disk image 22a for which there has been a write request signal and 0 to indicate a region in the read cache region Ac that corresponds to data of the disk image 22a for which there has not been a write request signal. The rewrite management table T2 is read to the physical memory of the terminal 20a.

The modified region map M is generation management data for generation-managing a transition of the revisions of the virtual disk 22b (the disk image 22a of the server 10) of the client terminal 20a, and is data that mainly indicates data of which region in the disk image 22a is modified between two different revisions. Further, it is also possible that the modified region map M is data that indicates data of which region in the disk image 22a is modified with respect to a revision as a reference, not necessarily between two difference revisions. For example, the modified region map M is a bit array that respectively uses 1 to indicate a region where data is modified with respect to the disk image 22a of the revision 8 and 0 to indicate a region where data is not modified. When data of the disk image 22a of the revision 8 is modified, in the modified region map M, a region corresponding to the data that is modified is updated to 1. Here, when it is considered that, due to the write request signal with respect to the data of the disk image 22a of the revision 8, the data of the disk image 22a of the revision 8 is modified, the modified region map M is the same size as the rewrite management table T2, and the modified region map M and the rewrite management table T2 can be handled in a same/similar way.

The dirty flag D is data that mainly indicates whether or not the data of the disk image 22a of the revision 8 is during a modification operation. For example, the dirty flag D is one-bit data that respectively indicates 1 when the data of the disk image 22a is during a modification operation and 0 when the data of the disk image 22a is not during a modification operation. A store region is provided in a part of the disk image 22a of the revision 8, and the dirty flag D is stored in the store region. The dirty flag D functions as a means for informing or notifying all client terminals that the disk image 22a of the revision 8 is during a modification operation. The read cache driver of the client terminal 20a does not utilize the cache in the terminal 20a when the value of the dirty flag D is 1, that is, when the disk image 22a of the revision 8 is during a modification operation. Further, the cache in the terminal 20a is utilized when the value of the dirty flag D is 0, that is, when the disk image 22a of the revision 8 is in a clean state in which the disk image 22a of the revision 8 is not during a modification operation.

When the disk image 22a of the revision 8 on the server 10 side is revised to the disk image 22a of a revision 9, or when the data of the disk image 22a of the revision 8 is modified, first, the client terminal 20a is booted in the private mode. In this case, the dirty flag D is set to 1. It is also possible that the data of the disk image 22a is not modified even when the dirty flag D is 1. As a result, in the case where the dirty flag D is 1 when the client terminal 20a is subsequently booted, it can be confirmed that the boot is the second or subsequent time in the private mode and it can be judged that some change has been made to the data of the disk image 22a of the revision 8 on the server side.

Therefore, in the case where the dirty flag D is 1 when the client terminal 20a is booted, by replacing the rewrite management table T2 with the modified region map M, specifically, copying the modified region map M to the rewrite management table T2 and applying the rewrite management table T2 to the cache management table T1, the read cache mechanism can identify a region where the disk image 22a is not modified, that is, a region where cache data of the disk image 22a of the revision 8 can be utilized as is, and effectively utilize the cache data. As a result, network access from the client terminal 20a to the server 10 can be reduced and decrease in the boot speed and slowness in operation of the client terminal 20a can be suppressed. Next, a method for applying the rewrite management table T2, to which the modified region map M is copied, to the cache management table T1 is described.

Figure 3A:
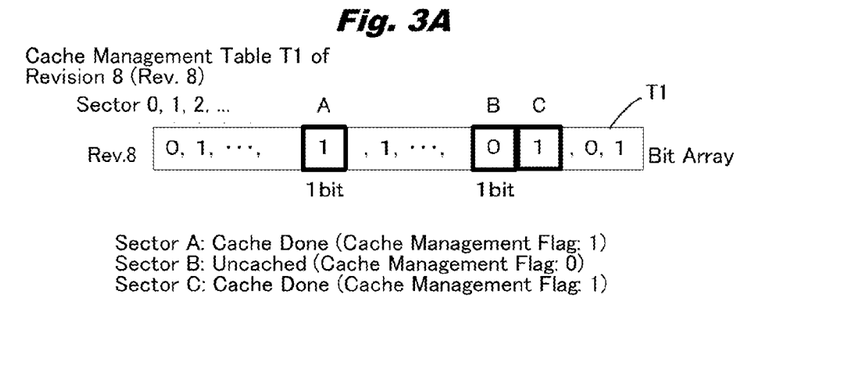
FIG. 3A illustrates an example of a cache management table of a revision 8.
Figure 3B:
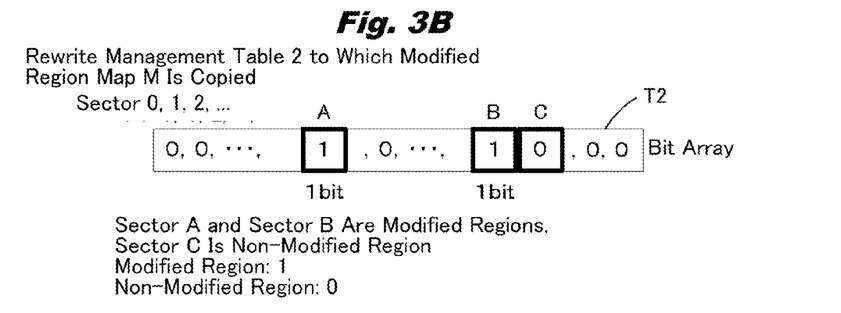
FIG. 3B illustrates an example of a rewrite management table to which a modified region map M is copied.
Figure 3C:
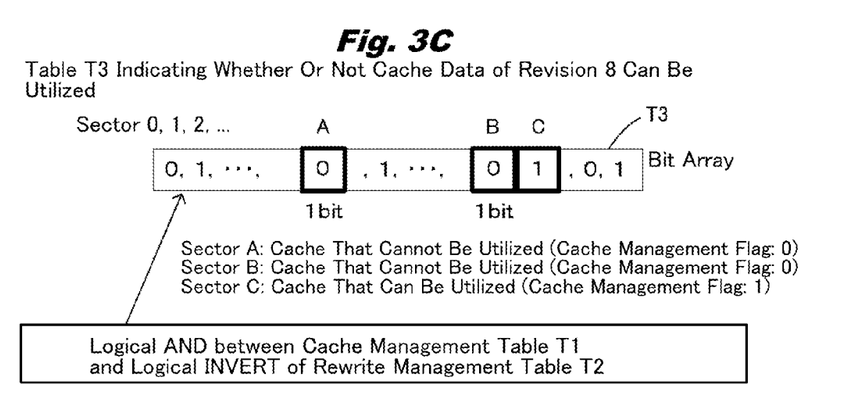
FIG. 3C illustrates an example of a method applying the rewrite management table to the cache management table.

FIGS. 3A-3C illustrate conceptual diagrams describing a cache management table to which a rewrite management table is applied in the network boot system of the present embodiment. FIG. 3A illustrates an example of the cache management table of the revision 8; FIG. 3B illustrates an example of the rewrite management table to which the modified region map M is copied; and FIG. 3C illustrates an example of a method for applying the rewrite management table to the cache management table.

As illustrated in FIG. 3A, in the cache management table T1 of the revision 8, a bit for a sector A is set to 1, a bit for a sector B is set to 0, and a bit for a sector C is set to 1. This indicates that data of the disk image 22a of the revision 8 is already stored (cache done) as cache data at the sectors A and C of the read cache region of the terminal 20a, and that cache data is absent (uncached) at the sector B. By referencing the cache management table T1 of the revision 8, the read cache mechanism can access cache data of a cache-done sector and, when data corresponding to an uncached region in the disk image 22a of the revision 8 is read, can store the data as cache data.

As illustrated in FIG. 3B, in the rewrite management table T2, to which the modified region map M is copied, a bit for the sector A is set to 1, a bit for the sector B is set to 1, a bit for the sector C is set to 0, and bits for other sectors are set to 0. This indicates that, when data of the disk image 22a of the revision 8 is modified in the private mode, the sectors A and B of the read cache region are regions (modification regions) where data were modified and the sector C and other sectors are regions (no-modification regions) where data were not modified.

The modified region map M and the rewrite management table T2 both only indicate a region, for example, a sector in a hard disk, that corresponds to a read cache region that was modified due to write to the disk image (virtual disk) 22a, and do not hold any information about content of data in the region. Therefore, the size of the modified region map M and the rewrite management table T2 both can be much smaller than a size of the disk image 22a. For example, using a recording unit of a current hard disk and the like as an example, when data of 512 bytes is stored in one sector, since it is 1 bit per 512 bytes (=4096 bits), it is clear that the sizes of the modified region map M and the rewrite management table T2 may be only 1/4096 (=1 bit/512 bytes) of the capacity of the virtual disk.

As illustrated in FIG. 3C, in table T3 that indicates whether or not the cache data of the revision 8 can be utilized, a bit for the sector A is set to 0, a bit for the sector B is set to 0, and a bit for the sector C is set to 1. This indicates that, in the sector A of the read cache region of the client terminal 20a, although data of the disk image 22a of the revision 8 has already been stored as cache data (cache done), since the region has been modified, the cache data of the region cannot be utilized. It indicates that, in the sector B, although there is no cache data (uncached), since the region has been modified, the cache data of the region cannot be utilized. It indicates that, in the sector C, data of the disk image 22a of the revision 8 has already been stored as cache data (cache done) and the region has not been modified, and thus the cache data of the region can be utilized. It also includes that, in other sectors for which bits are set to 0, there is no cache data (uncached) and the regions have not been modified. In any case, 1 is used to indicate a sector where cache data of the disk image 22a of the revision 8 can be utilized and 0 is used to indicate a sector where cache data cannot be utilized.

The table T3 can be obtained by extracting the modified sectors A and B of the read cache region in the rewrite management table T2 and setting the sectors A and B of the cache management table T1 of the revision 8 to 0 (state in which cache cannot be utilized), that is, by calculating a logical AND between the cache management table T1 and an INVERT of the rewrite management table T2. By using the table T3, the read cache mechanism can effectively utilize a part of the cache data of the revision 8 in which data of the disk image 22a of the revision 8 is not modified.

In the network boot system 100 of the present embodiment, even when the client terminal 20a is booted the second or subsequent time in the private mode, by replacing the rewrite management table T2 with the modified region map M and applying the rewrite management table T2 to the cache management table T1, the part of the cache data of the revision 8 corresponding to data of the disk image 22a of the revision 8 that is not modified can be effectively utilized. Therefore, decrease in boot speed and slowness in operation of the client terminal 20a can be suppressed.

Figure 4:
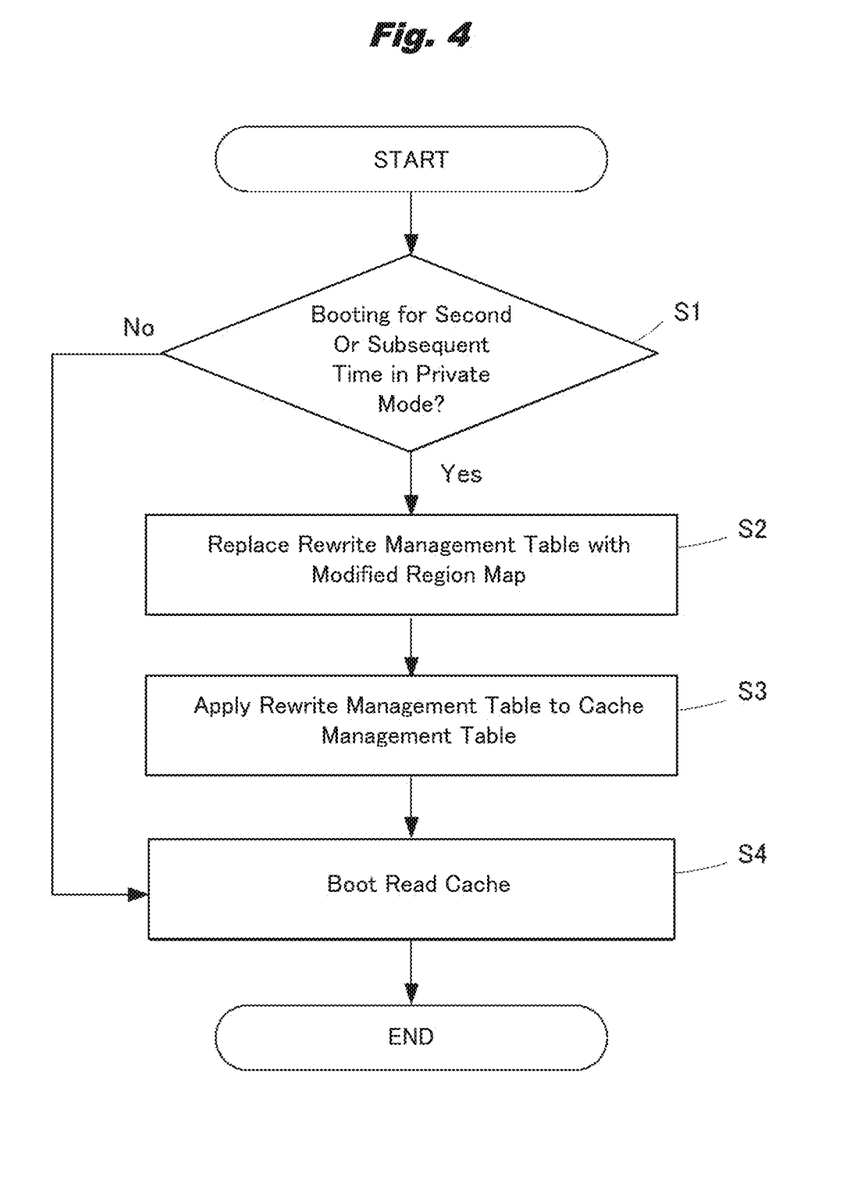
FIG. 4 illustrates a flow diagram illustrating an example of a flow in which a read cache mechanism is booted in the network boot system of the present embodiment.

FIG. 4 illustrates a flow diagram illustrating an example of a flow in which a read cache mechanism is booted in the network boot system of the present embodiment. First, it is determined whether or not a client terminal is booted the second or subsequent time in the private mode (S1). In this case, the determination can be easily performed by checking a dirty flag stored in a flag store region. The determination may also be performed by checking a modified region map. Next, when the client terminal is booted the second or subsequent time in the private mode, a rewrite management table is replaced with the modified region map (S2). In this process, it is also possible to copy the modified region map to the rewrite management table. Next, the rewrite management table is applied to a cache management table (S3). As a result, it is possible to decide whether a region where cache data can be utilized or a region where cache data cannot be utilized, and the read cache can be booted while avoiding using cache data that has been modified. The read cache mechanism is provided with a program that processes the above steps. Thereby, even when the client terminal 20a is booted the second or subsequent time in the private mode, the read cache mechanism can effectively utilize the cache data stored in the client terminal.

Even in a case of switching to the standard mode after booted in the private mode, when performing the boot in the standard mode "without updating the revision," the network boot system of the present embodiment can effectively utilize the cache data stored in the client terminal. Specifically, examples of such a case may include: a case where a user forgets to update the revision; a case where a modification operation of the data of the disk image is minor to the extent that it is unnecessary to update the revision; a case where an operation is performed on each terminal with some meanings given to update the revision; a case where, during a process of performing an update operation of the disk in the private mode, it is desired to temporarily change to the standard mode to perform an operation test at a plurality of terminal; and the like.

As illustrated in FIGS. 1 and 2, even when the client terminal 20a is shutdown after the client terminal 20a is booted in the private mode, the mode is changed to the standard mode, and any one of the client terminals 20 (20a, . . . ) is booted thereafter without updating from the revision 8 to the revision 9, in a manner similar to the above-described steps, for example, by replacing the rewrite management table T2 with the modified region map M and applying the rewrite management table T2 to the cache management table T1 in the client terminal 20a, the network boot system 100 of the present embodiment can effectively utilize the cache data of the revision 8 corresponding to the data of the disk image 22a of the revision 8 that is not modified. Therefore, decrease in boot speed and slowness in operation of the client terminals 20 (20a, . . . ) can be suppressed. In particular, in a case where a modification operation of the data of the disk image 22a of the revision 8 takes time, by combining the above-described boot procedure of when the client terminal 20a is booted the second or subsequent time in the private mode, even when the operation mode is arbitrarily changed to the private mode or the standard mode, a read cache in each terminal can be booted and cache data can be effectively utilized.

In the network boot system of the present embodiment, whether or not data of the disk image of each revision is during a modification operation, specifically, whether or not the client terminal is booted the second or subsequent time in the private mode, is determined based on the value of the dirty flag D. However, it is also possible to similarly use the dirty flag D to determined "whether or not the boot is after switching to the standard mode without updating the revision after booted in the private mode." For example, the dirty flag D is data in which a value of 1 is written when booted in the private mode and a value of 0 is written when updating the revision, and is one bit data that respectively indicates 1 when the data of the disk image 22a of the revision 8 is during a modification operation and 0 when the data of the disk image 22a is not during a modification operation. Despite the boot in the standard mode, when the dirty flag D is 1, it is determined that "the boot is after switching to the standard mode without updating the revision after booted in the private mode." Further, it is also possible to determine using a flag in addition to the dirty flag D.

The network boot system of the present embodiment is very effective also in a Virtual Desktop Infrastructure (VDI) environment in which a large number of client terminals utilize a desktop environment. In a conventional VDI environment, virtualized desktop OSs corresponding to the client terminals are respectively stored on the server, and a maintenance operation is performed with respect to each of the virtualized desktop OSs.

In the network boot system of the present embodiment, it is sufficient to maintain, in the private mode, the virtualized desktop OSs that are consolidated on the server. Further, a maintenance operation can be performed in the private mode from any client terminal. When performing the maintenance operation, cache data stored in the client terminal can be effectively utilized. Therefore, the maintenance operation can be more efficiently performed.

In the VDI environment of which an object is to shift personal terminals of a company or the like to a virtual PC environment, it is not necessarily desired, when a terminal is rebooted, an environment of the terminal is restored to an initial state. Rather, it is desired that, when the terminal is rebooted, the environment of the terminal is the same as an environment at an end of a previous operation. Further, in a system in which a hard disk region is allocated for each of the virtual PCs, physical disk capacity required for the OS and applications with respect to each of the virtual PCs becomes large, and a large number of common data sets are distributed in the physical disk.

Therefore, in the network boot system of the present embodiment, in order for an environment to be the same as an environment at end of a previous operation even when the terminals 20 are rebooted in a VDI environment, as illustrated in FIG. 2, the above-described write management table T2 is stored on the disk 21a, not on the physical memory 23a in the client terminal 20a. As a result, the physical disk capacity required for the OS and applications with respect to each of the virtual PCs can be suppressed. Even when the terminals 20 are shutdown, the data of the write management table T2 and the write cache are held on the disk 21a. When the terminals 20 are booted next time, the write management table T2 and the data of the write cache can be continuously utilized.

EXPLANATION OF REFERENCES

10: server (network boot server)
11: physical disk (hard disk)
20: client terminal
20a: client terminal
21a: physical disk
22b: virtual disk (vDisk)
23a: physical memory
30: network
100: network boot system
Ac: read cache region
D: dirty flag
M: modified region map (generation management data)
T1: cache management table
T2: rewrite management table
T3: table indicating whether or not cache data of revision 8 can be utilized

The invention claimed is:
1. A network boot system, wherein
a network boot server and a client terminal are connected over a network, the network boot server providing a disk image, as a virtual disk, containing an operating system that operates on the client terminal, the client terminal being provided with a physical storage device, the operating system is provided with a read cache mechanism that stores data read from the server as cache data in the storage device, the network boot system is provided with generation management data for generation-managing a transition of revision that represents revise information of the virtual disk and a rewrite management table for managing a write cache on the client terminal side, and the read cache mechanism, when the client terminal is booted the second or subsequent time in a private mode in which the client terminal directly writes to the virtual disk, replaces the rewrite management table with the generation management data and boots up a read cache while avoiding using cache data that has been modified.

2. The network boot system according to claim 1, wherein the rewrite management table is stored on the client terminal side, and when the client terminal is booted the second or subsequent time in the private mode, the generation management data is copied to the rewrite management table.

3. The network boot system according to claim 1, further comprising:

a store region having at least one bit for respectively writing a certain value P when the client terminal is booted in the private mode and a value other than the certain value P at an end of the private mode in a part of the virtual disk, wherein when a value of the store region is the certain value P, the read cache mechanism determines that the client terminal is booted the second or subsequent time in the private mode and boots up the read cache.

4. A network boot server, providing over a network a disk image, as a virtual disk, containing an operating system that operates on the client terminal to a client terminal, wherein the operating system is provided with a read cache mechanism that stores data read from the server as cache data, the client terminal is provided with a rewrite management table for managing a write cache, and, the network boot server comprises generation management data for generation-managing a transition of revision that represents revise information of the virtual disk, and the generation management data is copied to the rewrite management table when the client terminal is booted the second or subsequent time in a private mode in which the client terminal directly writes to the virtual disk.

5. A client terminal in a network boot system, which is connected over a network to a network boot server that provides a disk image, as a virtual disk, containing an operating system that operates on the client terminal, wherein the operating system is provided with a read cache mechanism that stores data read from the server as cache data in a storage device, the network boot server comprises generation management data for generation-managing a transition of revision that represents revise information of the virtual disk, the client terminal is provided with a rewrite management table for managing a write cache, and the generation management data is copied to the rewrite management table when the client terminal is booted the second or subsequent time in a private mode in which the client terminal directly writes to the virtual disk.

6. A boot procedure of a read cache mechanism of a network boot system in which a network boot server and a client terminal are connected over a network, the network boot server providing a disk image, as a virtual disk, containing an operating system that operates on the client terminal;

the operating system is provided with a read cache mechanism that stores data read from the server as cache data in the terminal, the network boot system is provided with generation management data for generation-managing a transition of revision that represents revise information of the virtual disk, and rewrite management table for managing a write cache on the client terminal side, wherein the boot procedure comprises:

a determination step of determining whether or not the client terminal is booted the second or subsequent time in a private mode in which the client terminal directly writes to the virtual disk;

a step of, when the client terminal is booted the second or subsequent time in the private mode, replacing the generation management data with the rewrite management table of the client terminal; and a step of booting up a read cache using the replaced rewrite management table while avoiding using cache data that has been modified.

7. The boot procedure of the read cache mechanism according to claim 6, wherein the network boot system comprises a store region having at least one bit for respectively writing a certain value P when the client terminal is booted in the private mode and a value other than the certain value P at an end of the private mode in a part of the virtual disk, and the determining step determines that, when a value of the store region is the certain value P, the client terminal is booted in the private mode and the second or subsequent time.

8. A network boot system, wherein a network boot server and a client terminal are connected over a network, the network boot server providing a disk image, as a virtual disk, containing an operating system that operates on the client terminal, the client terminal being provided with a physical storage device, the operating system is provided with a read cache mechanism that stores data read from the server as cache data in the storage device, the network boot system is provided with generation management data for generation-managing a transition of revision that represents revise information of the virtual disk and a rewrite management table for managing a write cache on the client terminal side, and the read cache mechanism replaces the rewrite management table with the generation management data at boot time after switching to a standard mode in which the virtual disk is shared and used without updating a revision after the client terminal being booted in a private mode in which the client terminal directly writes to the virtual disk, and boots up a read cache while avoiding using cache data that has been modified.

9. The network boot system according to claim 8, wherein the rewrite management table is stored on the client terminal side, and the generation management data is copied to the rewrite management table at the boot time after switching to the standard mode without updating the revision after booted in the private mode.

10. The network boot system according to claim 8, wherein
a store region having at least one bit is provided in a part of the virtual disk for respectively writing therein a certain value P' when the client terminal is booted in the private mode and a value other than the certain value P' when the revision is updated, and
in a case where a value of the store region is the certain value P' during booted in the standard mode, the read cache mechanism determines that the boot is caused after switching to the standard mode without updating the revision after the client terminal being booted in the private mode and boots up a read cache.

11. A network boot server, providing a disk image as a virtual disk to a client terminal over a network, the disk image containing an operating system that operates on the client terminal, wherein
the operating system is provided with a read cache mechanism that stores data read from the server as cache data,
the client terminal is provided with a rewrite management table for managing a write cache, and
the network boot server comprises generation management data for generation-managing a transition of revision that represents revise information of the virtual disk, and
the generation management data is copied to the rewrite management table at boot time after switching to a standard mode in which the virtual disk is shared and used without updating a revision after the client terminal being booted in a private mode in which the client terminal directly writes to the virtual disk.

12. A client terminal in a network boot system, the client terminal being connected over a network to a network boot server that provides a disk image, as a virtual disk, containing an operating system that operates on the client terminal, the client terminal, wherein
the operating system is provided with a read cache mechanism that stores data read from the server as cache data in a storage device,
the network boot server comprises generation management data for generation-managing a transition of revision that represents revise information of the virtual disk,
the client terminal is provided with a rewrite management table for managing a write cache, and,
the generation management data is copied to the rewrite management table at boot time after switching to a standard mode in which the virtual disk is shared and used without updating a revision after the client terminal being booted in a private mode in which the client terminal directly writes to the virtual disk.

13. A boot procedure of a read cache mechanism of a network boot system in which
a network boot server and a client terminal are connected over a network, the network boot server providing a disk image, as a virtual disk, containing an operating system that operates on the client terminal,
the operating system is provided with a read cache mechanism that stores data read from the server as cache data in the terminal,
the network boot system is provided with
generation management data for generation-managing a transition of revision that represents revise information of the virtual disk, and
a rewrite management table for managing a write cache on the client terminal side, wherein
the boot procedure comprises:
a determination step of determining whether or not the client terminal is booted after switching to a standard mode in which the virtual disk is shared and used without updating a revision after the client terminal is booted in a private mode in which the client terminal directly writes to the virtual disk;
a step of, when the boot is after switching to the standard mode without updating the revision after booted in the private mode, replacing the generation management data as the rewrite management table of the client terminal; and
a step of booting up a read cache using the replaced rewrite management table while avoiding using cache data that has been modified.

14. The boot procedure of the read cache mechanism according to claim 13, wherein
a store region having at least one bit is provided in a part of the virtual disk for respectively writing therein
a certain value P' when the client terminal is booted in the private mode and
a value other than the certain value P' when the revision is updated, and
the determining step determines that, when a value of the store region is the certain value P', the client terminal is booted after switching to the standard mode without updating the revision after the client terminal is booted in the private mode.

15. A boot procedure of a read cache mechanism of a network boot system in which
a network boot server and a client terminal are connected over a network, the network boot server providing a disk image, as a virtual disk, containing an operating system that operates on the client terminal,
the operating system is provided with a read cache mechanism that stores data read from the server as cache data in the terminal,
the network boot system is provided with
generation management data for generation-managing a transition of revision that represents revise information of the virtual disk, and
a rewrite management table for managing a write cache on the client terminal side, wherein
the boot procedure comprises:
a determination step of determining whether or not a boot is caused during a modification operation of the virtual disk;
a step of, when the boot is caused during the modification operation of the virtual disk, replacing the generation management data with the rewrite management table of the client terminal; and
a step of booting up a read cache using the replaced rewrite management table while avoiding using cache data that has been modified, wherein
a store region having at least one bit is provided in a part of the virtual disk for respectively writing therein
a certain value P when the client terminal is booted in the private mode and
a value other than the certain value P when the revision is updated, and
when a value of the store region is the certain value P, the determining step determines that the boot is caused during the modification operation of the virtual disk.

* * * * *